Patented Nov. 17, 1942

2,301,913

UNITED STATES PATENT OFFICE 2,301,913

CATALYTIC TREATMENT OF HYDRO-
CARBONS

Preston L. Veltman, Fishkill, N. Y., assignor, by mesne assignments, to The Texas Company, New York, N. Y., a corporation of Delaware No Drawing. Application January 13, 1940,
Serial No. 313,759

20 Claims. (Cl. 196—52)

This invention relates to the catalytic treatment of hydrocarbons and particularly to the catalytic treatment of petroleum hydrocarbons.

Broadly the invention contemplates treatment of hydrocarbons to effect molecular transformation thereof by contact with a solid substantially non-volatile catalyst comprising a phosphate of a metal of the group set out below associated with a solid metallic fluoride in active form. The invention has particular application to the catalytic cracking of hydrocarbon oil wherein high molecular weight hydrocarbons are converted to low molecular weight hydrocarbons for the production of hydrocarbons suitable for the manufacture of internal combustion motor fuel.

The invention also has application to the reforming of hydrocarbons such as the reforming of naphtha hydrocarbons to improve their value as constituents of motor fuel.

In the catalytic cracking of oils to produce gasoline it has been the common practice to employ as catalysts such materials as fuller's earth, kieselguhr, activated clays, artificial zeolites, and synthetic compositions composed essentially of alumina and silica. It has also been proposed to incorporate in such catalysts various metallic oxides, such as the oxides of chromium, molybdenum, etc.

Ordinarily the oil to be cracked is heated and vaporized and the hot vapors are brought into contact with the solid catalyst under controlled conditions of temperature and pressure. The reaction products, including gas, gasoline hydrocarbons and higher boiling hydrocarbons, are separated in conventional ways. During the conversion coke-like material is deposited on the catalyst, reducing its activity and ability to catalyze the hydrocarbon conversion, and it becomes necessary to reactivate the catalyst. This is accomplished by burning off the coke with a stream of air or oxygen-containing gas. After thus reactivating the catalyst it may be reused in cracking additional quantities of oil.

It has been found that catalysts comprising solid fluorides or fluoride compounds, such as the fluorides of aluminum, chromium and magnesium, dispersed in active form upon solid carrier or supporting materials, are effective cracking catalysts. For example, hydrated aluminum fluoride dispersed upon silica gel, and when used as a catalyst in the cracking of hydrocarbon oil, gives results superior to those obtainable with the solid catalysts previously employed in the art.

The present invention contemplates employing these solid fluorides, or fluoride compounds, in association with or dispersed upon a metallic phosphate selected from the group consisting of the phosphates of aluminum, titanium, chromium, iron, uranium, zinc, nickel, boron, lanthanum, and cobalt.

For example, a catalyst comprising aluminum phosphate in major proportion and aluminum fluoride hemihydrate in minor proportion has been found to be a very effective cracking catalyst producing a high yield of gasoline and relatively low yields of carbonaceous and gaseous materials. This particular catalyst was prepared by treating aluminum phosphate, in the form of a gel or slurry, with solid, finely-divided aluminum fluoride hemihydrate ($AlF_3 \cdot \frac{1}{2}H_2O$). The aluminum phosphate was prepared in the following manner:

987 grams of aluminum chloride-hexahydrate were dissolved in 2.5 liters of distilled water and 471 grams of 85% phosphoric acid were dissolved in a separate portion of water sufficient to form a total volume of 2.5 liters of dilute acid. The two solutions were mixed with thorough agitation.

The mixture was then treated with an ammonium hydroixde solution (consisting of equal parts by weight of distilled water and concentrated $NH_4OH$ of 0.90 specific gravity) to form a precipitate, sufficient hydroxide solution being added to render the mixture just acid to litmus. The resulting precipitate was removed by filtering and washed with distilled water.

The hydrated aluminum fluoride was prepared by treating an aqueous solution of aluminum chloride with an aqueous solution of ammonium fluoride in stoichiometric proportions to form aluminum fluoride hydrate. After washing and drying the precipitated hydrate it was decomposed by heating several hours at 1000° F. to form the hemi-hydrate ($AlF_3 \cdot \frac{1}{2}H_2O$).

The hemi-hydrate of aluminum fluoride, ground to 200 mesh, was then mixed with a slurry of the aluminum phosphate and water. The fluoride was added in proportion sufficient to give a composite containing 20% $AlF_3 \cdot \frac{1}{2}H_2O$ by weight.

The composite was filtered and dried at 250° F. The dried material was ground to 40 mesh, pelleted and calcined by heating at 1000° F. for eight hours. The resulting catalyst consisted of about 20% by weight of aluminum fluoride hemihydrate and 80% of aluminum phosphate, the phosphate containing a small amount of alumina, i. e., about 1 to 10% by weight.

The catalyst was then tested as a catalyst for the cracking of a virgin gas oil having an end boiling point of 700° F. and derived as a distillate from East Texas crude. The gas oil, heated to the conversion temperature, was charged continuously to a tower packed with 180 cubic centimeters of the catalyst in pellet form. The tower was operated under atmospheric pressure.

Prior to making the following runs the catalyst had been seasoned by using and reactivating several times:

|  | Run 1 | Run 2 | Run 3 | Run 4 |
|---|---|---|---|---|
| Temperature °F | 750 | 850 | 900 | 900 |
| Space velocity cc. of charge per 180 cc. catalyst | 1.1 | 2.2 | 2.2 | 4.0 |

Yield of 400° end point debutanized gasoline (volume per cent basis charge)

|  | Run 1 | Run 2 | Run 3 | Run 4 |
|---|---|---|---|---|
| Average for the first 200 cc. of charge | 16.6 | 25.2 | 27.4 | 25.4 |
| Average for the first 800 cc. of charge | 15.8 | 17.7 | 21.0 | 18.5 |
| Average Octane No. CFRM |  | 83.6 | 81.5 |  |
| Carbon weight percent of 800 cc. charge | 1.0 | 0.5 | 1.0 | 0.8 |
| Gas weight percent of 800 cc. charge | 0.3 | 2.6 | 5.8 | 3.8 |

As indicated, the catalyst is effective at relatively low temperature, even as low as 750° F. Moreover, the conversion yield of 400° F. end point debutanized gasoline obtained with the composite catalyst, is superior to that obtained when using a catalyst consisting merely of aluminum phosphate. Thus, when using pelleted aluminum phosphate, in the absence of fluoride, as a conversion catalyst with the same gas oil stock, at a temperature of 1000° F. and with a space velocity of 2.2, the conversion yield was only around 10 or 11% by volume of the charge. The composite catalyst also gives a higher conversion than is obtained with aluminum fluoride alone.

The following experiment was made in order to compare the above catalyst with a standard catalyst, namely, a silica-alumina type of catalyst containing a high ratio of silica to alumina. Both runs were made at a temperature of 900° F. in a manner similar to that described above, and using a space velocity of 2.2, charging the same type of gas oil stock at the rate of 400 cubic centimeters per hour. The gas oil was heated to the conversion temperature and continuously charged in vapor form to the reaction tower which was maintained at a temperature of 900° F.

|  | Standard catalyst | Aluminum phosphate-aluminum fluoride catalyst |
|---|---|---|
| Volume per cent of 400° end point debutanized gasoline basis charge: |  |  |
| Basis first 200 cc. of charge | 25.6 | 27.4 |
| Basis first 800 cc. of charge | 22.6 | 21.0 |
| Weight per cent of gas: Basis 800 cc. of charge | 7.9 | 5.1 |
| Weight per cent carbon: |  |  |
| Basis first 200 cc. of charge | 2.8 | 1.7 |
| Basis first 800 cc. of charge | 1.05 | 0.68 |
| Gallons of gasoline per pound of carbon: |  |  |
| Basis first 200 cc. of charge | 1.42 | 2.14 |
| Basis first 800 cc. of charge | 3.17 | 4.48 |

As the foregoing data indicate, the aluminum phosphate-aluminum fluoride catalyst produced a substantially higher yield of gasoline on the basis of the first 200 cc. of charge, while on the basis of 800 cc. of charge the yield was only slightly lower than that obtained with the standard catalyst. However, the yield of gas and carbon was much lower than with the standard catalyst, both on the basis of 200 cc. of charge and 800 cc. of charge.

Comparing the gasoline yields on the basis of gallons of gasoline produced per pound of carbon formed, it will be noted that the catalyst of this invention gave higher yields of gasoline per pound of carbon deposited than did the standard catalyst.

While aluminum fluoride has been specifically mentioned, it is contemplated that other metal and metalloid fluorides which are stable and substantially non-volatile at temperatures up to about 1200° F. may be employed, including, for example, the fluorides of metal elements, such as chromium, magnesium, barium, calcium, cerium, copper, iron, manganese, nickel, potassium, strontium, uranium, lanthanum, etc., as well as metalloid elements, such as bismuth.

Likewise, as already set forth, the phosphates may include the phosphates of other metals of the group set out above besides aluminum.

It is an important object of the invention to use a solid type of catalyst containing the fluoride in an active form and in a form which is stable and substantially non-volatile under the conditions of temperature above specified. The catalyst is thought to be particularly effective when in a porous non-fused form.

The catalyst may be employed in granular, pill or powdered form. It is contemplated that the powdered form of catalyst is particularly applicable to a cracking system wherein the catalyst is passed continuously through the reaction zone.

The operating conditions maintained within the reaction zone may be varied as desired. For example, the cracking temperature may range from about 700 to 1100° F. and the pressure may vary from around atmospheric to around 100 pounds or even higher. Either vapor phase or liquid phase cracking conditions may be maintained.

A characteristic of the catalyst of this invention is the low yield of carbon produced even at low temperatures, such as 700 to 750° F., and at which temperatures liquid hydrocarbons in substantial amount are in contact with the catalyst. The low deposition of carbon in the presence of liquefied hydrocarbons renders the catalyst adaptable to liquid phase cracking or cracking under substantial pressures.

The catalyst is readily regenerated by blowing with a gas containing oxygen available for combustion. Moreover, regeneration may be effected in a relatively short time at low temperatures, i. e., 700 to 750° F., without substantial rise in temperature as compared with previously known catalysts. While this is in part due to the smaller deposition of carbon, it also appears that the carbonaceous material is deposited in a form which appears to be more readily burned and removed from the catalyst.

While the specific catalyst described above contained around 20% by weight of hydrated aluminum fluoride, catalysts containing smaller amounts of the fluoride have also been found effective, and therefore it is contemplated employing catalysts containing around 1 to 20% by weight of the hydrated fluoride.

Obviously many modifications and variations of the invention as hereinbefore set forth may be made without departing from the spirit and scope thereof, and therefore only such limitations should be imposed as are indicated in the appended claims.

I claim:

1. A solid catalyst adapted for the conversion of hydrocarbons at elevated temperatures comprising a major proportion of a multivalent metallic phosphate, and a minor proportion of a solid metallic fluoride which is stable and substantially non-volatile at temperatures below about 1200° F., said fluoride being dispersed upon said phosphate.

2. A solid catalyst adapted for the conversion of hydrocarbons at elevated temperatures comprising a phosphate of a metal selected from the group consisting of aluminum, titanium, chromium, iron, uranium, zinc, nickel, boron, lanthanum and cobalt, and a solid metallic fluoride which is stable and substantially non-volatile at temperatures below about 1200° F.

3. A solid catalyst adapted for the conversion of hydrocarbons at elevated temperatures comprising a phosphate of a metal selected from the group consisting of aluminum, titanium, chromium, iron, uranium, zinc, nickel, boron, lanthanum and cobalt, and a solid metallic fluoride which is stable and substantially non-volatile at temperatures below about 1200° F., said fluoride being dispersed upon said phosphate.

4. A solid catalyst adapted for the conversion of hydrocarbons at elevated temperatures which contains a major proportion of a phosphate of a metal selected from the group consisting of aluminum, titanium, chromium, iron, uranium, zinc, nickel, boron, lanthanum and cobalt, and a minor proportion of a solid metallic fluoride which is stable and substantially non-volatile at temperatures below about 1200° F., said fluoride being dispersed upon said phosphate.

5. A catalyst in accordance with claim 4 in which the fluoride comprises aluminum fluoride.

6. A catalyst in accordance with claim 4 in which the fluoride comprises hydrated aluminum fluoride.

7. A catalyst in accordance with claim 4 in which the fluoride comprises magnesium fluoride.

8. A catalyst in accordance with claim 4 in which the fluoride comprises chromium fluoride.

9. A solid catalyst adapted for the conversion of hydrocarbons at elevated temperatures comprising aluminum phosphate and aluminum fluoride.

10. A solid catalyst adapted for the conversion of hydrocarbons at elevated temperatures comprising aluminum phosphate and magnesium fluoride.

11. A solid catalyst adapted for the conversion of hydrocarbons at elevated temperatures comprising aluminum phosphate and chromium fluoride.

12. A solid catalyst adapted for the conversion of hydrocarbons at elevated temperatures comprising aluminum phosphate in admixture with hydrated aluminum fluoride.

13. A solid catalyst adapted for the conversion of hydrocarbons at elevated temperatures comprising aluminum phosphate and a solid metallic fluoride which is stable and substantially non-volatile at temperatures below about 1200° F., said fluoride being dispersed upon said aluminum phosphate.

14. A solid catalyst adapted for the conversion of hydrocarbons at elevated temperatures which contains a major proportion of aluminum phosphate and a minor proportion of hydrated aluminum fluoride, said fluoride being dispersed upon said aluminum phosphate.

15. A solid catalyst adapted for the conversion of hydrocarbons at elevated temperatures comprising a major proportion of aluminum phosphate and a minor proportion of a solid hydrated metallic fluoride which is stable and substantially non-volatile at temperatures below about 1200° F., said catalyst being obtained by a process comprising mixing the hydrated metallic fluoride with an aluminum phosphate gel, and drying the resulting mixture.

16. A solid catalyst adapted for the conversion of hydrocarbons at elevated temperatures comprising a major proportion of aluminum phosphate and a minor proportion of hydrated aluminum fluoride, said catalyst being obtained by a process comprising mixing the hydrated aluminum fluoride with an aluminum phosphate gel, and drying the resulting mixture.

17. The process of cracking high molecular weight hydrocarbons to produce gasoline hydrocarbons which comprises passing the high molecular weight hydrocarbons at cracking temperatures into contact with a catalyst comprising a phosphate of a metal selected from the group consisting of aluminum, titanium, chromium, iron, uranium, zinc, nickel, boron, lanthanum and cobalt, and a solid metallic fluoride which is stable and substantially non-volatile at temperatures below about 1200° F.

18. A process of cracking high molecular weight hydrocarbons to produce gasoline hydrocarbons which comprises passing the high molecular weight hydrocarbons at cracking temperatures into contact with a solid catalyst which contains a major proportion of a phosphate of a metal selected from the group consisting of aluminum, titanium, chromium, iron, uranium, zinc, nickel, boron, lanthanum and cobalt, and a minor proportion of a solid metallic fluoride which is stable and substantially non-volatile at temperatures below about 1200° F., said fluoride being dispersed upon said phosphate.

19. A process of cracking high molecular weight hydrocarbons to produce gasoline hydrocarbons which comprises passing the high molecular weight hydrocarbons at cracking temperatures into contact with a solid catalyst comprising a major proportion of aluminum phosphate and a minor proportion of a solid hydrated metallic fluoride which is stable and substantially non-volatile at temperatures below about 1200° F., said catalyst being obtained by a process comprising mixing the hydrated metallic fluoride with an aluminum phosphate gel, and drying the resulting mixture.

20. A process of cracking high molecular weight hydrocarbons to produce gasoline hydrocarbons which comprises passing the high molecular weight hydrocarbons at cracking temperatures into contact with a solid catalyst comprising a major proportion of aluminum phosphate and a minor proportion of hydrated aluminum fluoride, said catalyst being obtained by a process comprising mixing the hydrated aluminum fluoride with an aluminum phosphate gel, and drying the resulting mixture.

PRESTON L. VELTMAN.